United States Patent [19]

Cameron

[11] 4,033,607
[45] July 5, 1977

[54] MEANS FOR ATTENUATING THE JARRING AND VIBRATION OF A TRUCK-TRACTOR

[75] Inventor: John Stratton Cameron, La Mirada, Calif.

[73] Assignee: Jeffries Truck Parts & Equipment, Inc., Bell, Calif.

[22] Filed: Oct. 30, 1975

[21] Appl. No.: 627,050

[52] U.S. Cl. .......................... 280/711; 267/65 D; 280/714; 296/28 C

[51] Int. Cl.² ...................................... B60G 11/26

[58] Field of Search .......... 280/702, 704, 706, 711, 280/712, 713, 714, 683, 106.5 R; 296/28 C; 267/64 R, 64 A, 65 R, 65 D, 122

[56] References Cited

UNITED STATES PATENTS

| | | | |
|---|---|---|---|
| 2,907,577 | 10/1959 | Weiss | 280/711 |
| 2,952,474 | 9/1960 | Gouirand | 280/711 |
| 3,104,679 | 9/1963 | Gouirand | 280/711 |
| 3,214,185 | 10/1965 | Mason | 280/711 |
| 3,224,522 | 12/1965 | Fleming | 280/683 |
| 3,841,694 | 10/1974 | Merkle | 267/65 D |

Primary Examiner—Joseph F. Peters, Jr.
Assistant Examiner—John A. Carroll
Attorney, Agent, or Firm—William H. Pavitt, Jr.

[57] ABSTRACT

Stabilization of a truck or tractor for a semi-trailer to eliminate or at least minimize, jarring and vibration of the truck or tractor frame and cab during its operation without load is accomplished by securing a transverse member preferably over a differential housing, to each of the longitudinal truck frame members to bridge the same, and by interposing between the center point on this bridging element, and the top of the differential housing an expandable and contractable air bellows. The truck's pressurized air is connected to this bellows through a manual control valve, preferably in line with an air gauge. A warning indicator may also be connected with the valve to indicate to the truck operator when the air bellows is inflated. Inflation of the air bellows is normally only to be effected when the truck is being operated without load.

8 Claims, 4 Drawing Figures

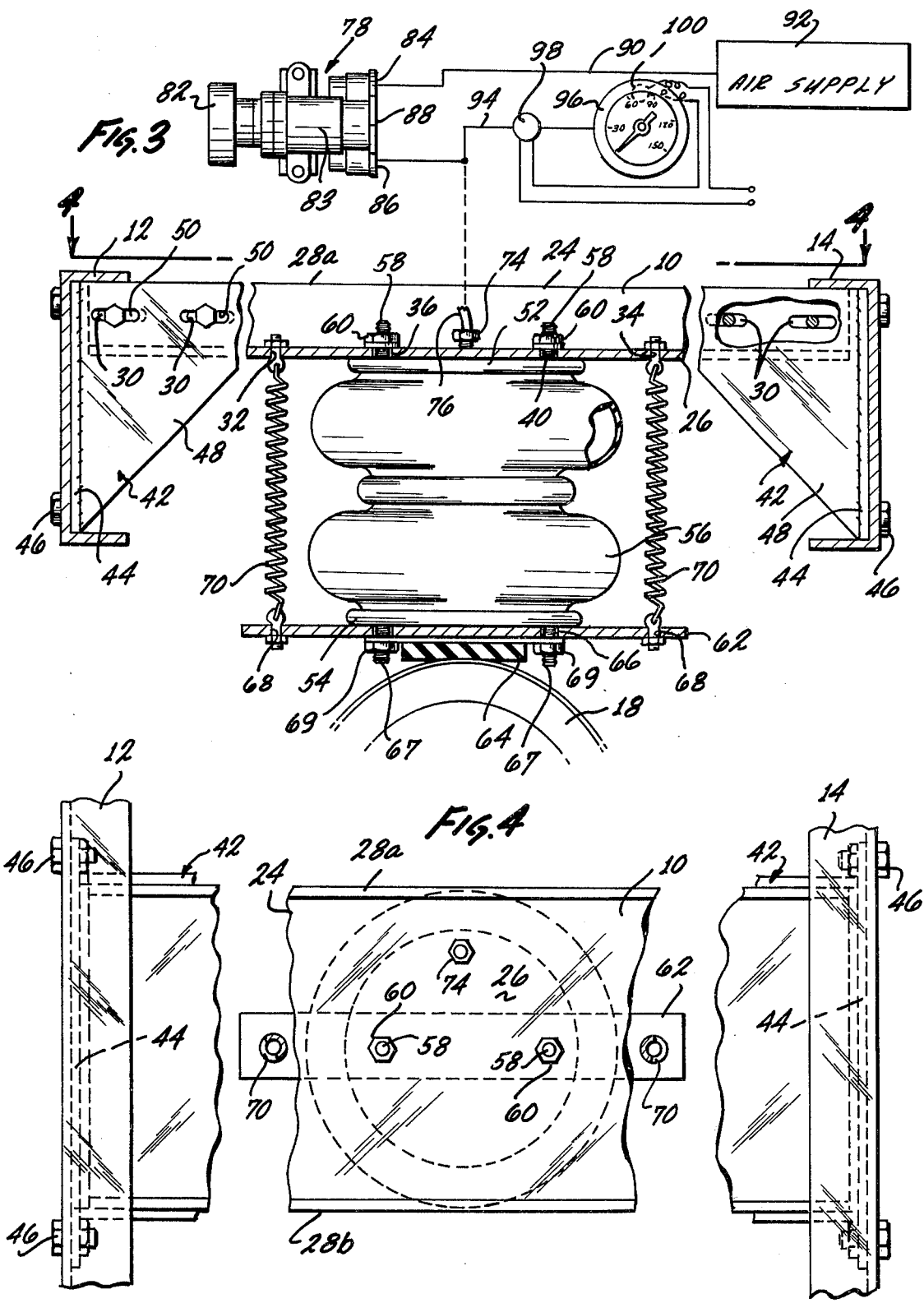

MEANS FOR ATTENUATING THE JARRING AND VIBRATION OF A TRUCK-TRACTOR

BACKGROUND OF THE INVENTION

The invention relates to the field of stabilized vehicles and, particularly, to truck and tractor vehicles which are employed for hauling loads upon the public highways.

2. Description Of The Prior Art

Because the suspension systems of trucks, and of tractors which are intended to be coupled to, and pull semi-trailers necessarily must be of such a nature as to sustain heavy loads, when such trucks and tractors are operated without load they have always been found to jar and vibrate, particularly when driven over roads which are not perfectly smooth, to such an extent that they not only produce considerable discomfort and annoyance to the operator, but they can, if driven empty over prolonged periods of time with such jarring and vibration, begin self-destruction in the weakers areas of the truck or tractor structure.

Although many efforts have been made by truck builders to reduce such jarring and vibration when their trucks are operated without load, heretofore none of such efforts appears to have met with any degree of success. Among such efforts, as may be seen in U.S. Pat. Nos. 2,929,619 and 2,947,531, has been the incorporation of pneumatic devices, such as bellows air type springs interposed adjacent each wheel between the axle and the frame and regulated by automatic valve means of the types disclosed in these patents. Notwithstanding the fact that the expedients disclosed in these two patents were devised almost 20 years ago, they do not appear to have been widely adopted, if at all, in any trucks or tractors offered today.

Other efforts to solve the jarring and vibration problem by providing pneumatic springs and control devices are exemplified by the following further patents, namely, U.S. Pat. Nos. 2,943,851, 3,215,339, 2,624,594, 2,879,077 and 2,989,301. Also, as may be seen in U.S. Pat. Nos. 3,137,515, 3,203,711 and 3,227,470, expandable bellows have been utilized in other ways in connection with trucks and trailers. However, in none of these prior art patents has any thought ever been given to utilizing pneumatic bellows for the purpose of stabilizing a truck or tractor during its operation without load except in the form of the unsuccessful efforts referred to above where pneumatic springs have been attempted to be substituted for the various spring-type suspension systems.

Thus, despite all of these prior art efforts to employ pneumatic devices, including expandable bellows, no one, prior to the present invention, has succeeded in devising any way for stabilizing trucks and tractors to eliminate or minimize jarring and vibration during empty operation.

SUMMARY OF THE INVENTION

The desired stabilization of a truck or tractor is accomplished effectively by the present invention which contemplates providing a rigid bridging element extending between the longitudinal parallel frame members of the truck chassis, with such bridging element preferably being disposed directly over a differential housing. Interposed between the mid point of this bridging element and the top of the differential housing, there is provided an expandable air bellows having a connection to a source of air pressure in the truck or tractor cab via a control valve, also located in the truck cab and conveniently accessible to the truck driver. A gauge is provided in conjunction with the control valve to enable the operator to determine the optimum pressure at which air is to be delivered to the bellows and, in conjunction therewith, a light indicator may be provided to warn the operator that the bellows are under pressure and that when the truck is to be loaded, the valve should be turned to shut off further air delivery to the bellows and to bleed the same, thereby to collapse the bellows. In this connection, plates are provided at both ends of the bellows, which plates are connected by compression springs to return the bellows to their collapsed state whenever air under pressure is not being delivered to the bellows and the air in the bellows is being bled off in response to the control valve.

After the bridging element and the bellows are installed and the air pressure line connected so that the bellows may be inflated in response to the control valve, the operator experiments with his control until he notes the smoothest ride in his truck or tractor. He then notes the gauge setting and thereafter, whenever the operator desires to restabilize his truck or tractor when he runs it empty, he simply turns the control valve to provide the same pressure gauge setting.

The bridging element, itself, may be easily mounted between the longitudinal frame members of the truck chassis, such element preferably being provided with an adjustable length to fit between a range of spacing between such members.

BRIEF DESCRIPTION OF THE DRAWINGS

In the accompanying drawings.

FIG. 3 is a view similar to FIGURE 1, but showing the air bellows in an expanded state and having added to the drawing of FIG. 2, a schematic view of the air pressure system and its control;

FIG. 4 is a planned view, partly broken away, as seen from a horizontal plane along the line and looking in the direction of the arrows 4—4 in FIG. 3.

DESCRIPTION OF THE PREFERRED EMBODIMENT

Figure 1:
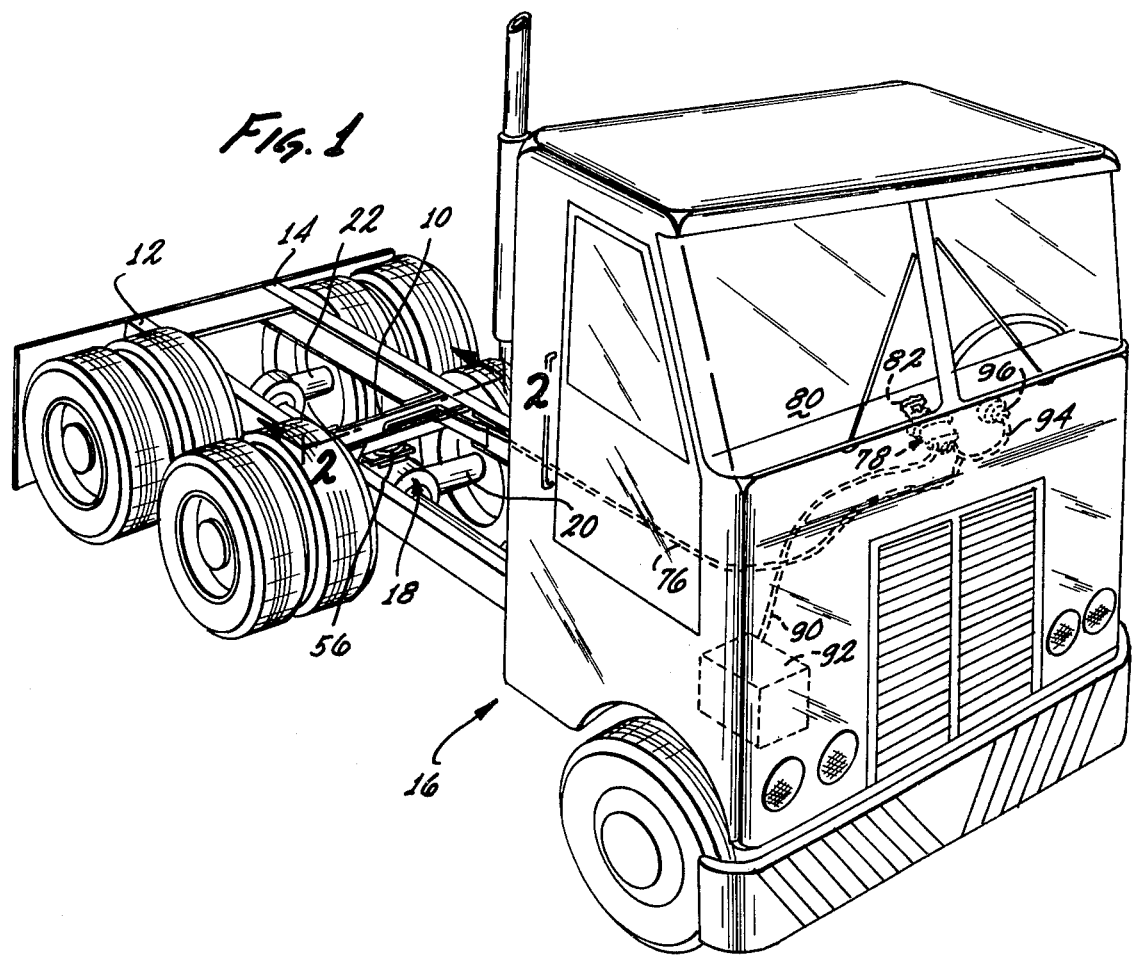
FIG. 1 is a perspective view of a tractor for semi-trailer in which a stabilizing system according to the present invention has been installed.

Referring to FIG. 1 of the drawings, the present invention contemplates providing a bridging element 10 between the longitudinal frame members 12 and 14 of a tractor, designated generally as 16, which is designed to pull a semi-trailer (not shown). The bridging element 10 is preferably disposed directly over the differential housing 18 of the forward one 20 of a pair of axle assemblies 20, 22.

Figure 2:
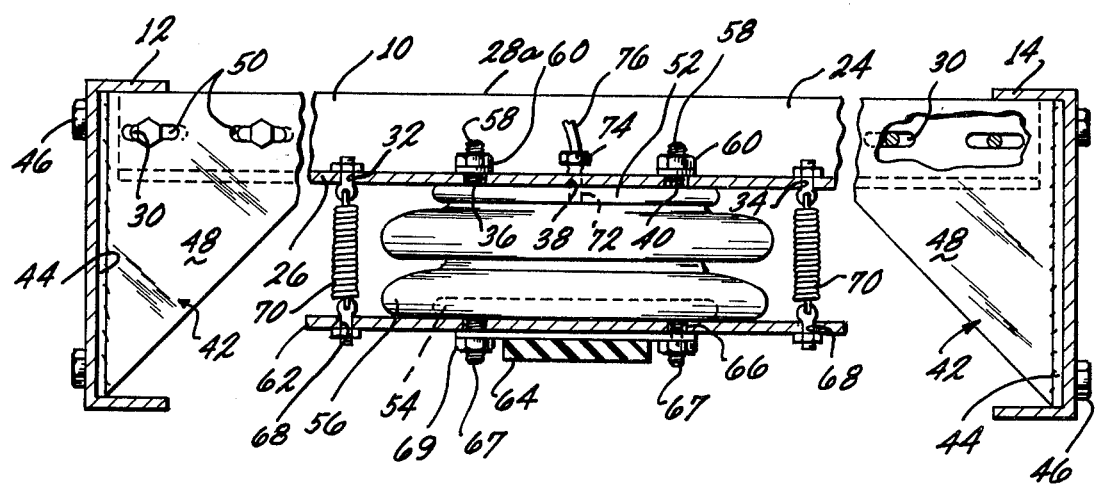
FIG. 2 is a front elevation, partly in section, of the air bellows and bridging element to which it is attached as seen from a vertical plane passing through the line 2—2, and looking in the direction of the arrows, of FIG. 1.

As may be better understood from a consideration of FIGS. 2, 3 and 4, the bridging element 10 may comprise a transverse U-shaped channel member 24, having a bottom wall 26 with integrally formed upwardly extending side walls 28a, 28b. Each of the side walls 28a, 28b may be slotted near both of its extremities at 30 in the manner shown in FIGS. 2 and 3. The bottom wall 26 is provided with a number of orifices 32, 34, 36, 38 and 40, the locations and functions will hereinafter be explained. The channel member 24 may be secured to and bridge the space between the longitudinal frame members 12 and 14, by means of pairs of angle plates 42. These angle plates 42 each have a vertical anchoring wall portion 44, which is orificed top and bottom to receive bolts 46, and a 90° angled, also vertical, portion 48, which is slottingly orificed at 50 in register with the orifices 30 in the side walls 28a and 28b of the element 24.

An air bellows, preferably of the type known as NEW WAY TC Air Bag Assembly, manufactured and sold by the Firestone Tire & Rubber Company of Cleveland, Ohio, is mounted to the underside of the bottom wall 26 of the bridging element 24. The air bellows referred to comprises a pair of circular plates 52, 54 between and attached to which is secured and expandable rubber bellows having a compressed configuration as shown in FIG. 2 and an expanded configuration as shown in FIG. 3. Projecting outwardly from each of the plates 52 and 54 are a pair of bolts 58. The air bellows unit is mounted to the underside of the bottom wall 26 of the element 24 by passing the bolts 58 through the orifices 36 and 40 and threading nuts 60 on to the bolts 58. A further elongated rectangular plate 62, having a neoprene or other resilient buffering plate 64 adhered to its underside, and orifices 66 registering with bolts 67 projecting downwardly from the underside of the plate 54, is secured against the latter by nuts 69. The plate 62 is further provided with orifices 68 towards its extremities and beyond the farthest point of expansion radially of the rubber bellows 56, and these orifices 68 taken in conjunction with the orifices 32 and 34 in the bottom wall 26 of the element 24, enable compression springs 70 to be attached between the bottom wall 26 and the plate 62.

The orifice 38 in the bottom wall 26 of the element 24 is disposed to register with the orifice 72 in the top plate 52 of the bellows unit and both of these orifices 38 and 72 may be threaded to receive the male threading on a nipple 74 on the end of an air hose 76. This air hose 76 extends forwardly from the element 24 to a valve 78, preferably located on the dashboard in the cab 80 of the tractor. The valve 78 may be a Model No. 5400 made and sold by Sealco Corporation of the City of Industry, Calif. This valve 78 is operated by a rotatable knob 82, and is provided at the opposite end of the valve body from that which the knob 82 projects with three openings 84, 86 and 88. An air conduit line 90 is provided to connect the truck's compressed air reservoir 92 with the inlet opening 84 in the valve body 83. The outlet opening 86 receives the other end connection of the line 76 from the air bellows 56. The opening 86 may also be connected by a further line 94 to an air gauge 96 in line with which may further be provided a pressure switch 98 for an indicator light 100 insertable at the rear of the air gauge 96. The opening 88 is an air bleed which the valve opens to the line 76 through opening 86 when the knob 82 is turned clockwise to air shut-off position.

In use, when a tractor or truck in which the system of the present invention has been incorporated is to be driven empty so that ride stabilization has been incorporated, the truck or tractor operator turns the knob 82, while watching the gauge 96, to draw from the truck's compressed air reservoir 92, pressurized air and, though the valve 78 and the conduit 76, convey it to air bladder 56 which the air enters through the nipple 74 and openings 38 and 62. Thereby the rubber air bladder 56 will be inflated to the extent that the bladder will expand in the manner shown in Figure 3, to where the neoprene buffering plate 64 presses tightly against the top of the differential housing 18. The truck or tractor operator then proceeds to drive the truck over the type of road or terrain over which he expects to drive for any distance, and adjusts the air bladder air pressure by turning the knob 82 either clockwise or counter-clockwise to where the operator feels that he is obtaining the smoothest and most stabilized ride. The operator then notes the reading on the pressure gauge 96 and thereafter maintains the setting of the valve 78 to provide optimum pressure so indicated by the gauge 96 indicated during the remainder of his empty ride. After the truck or tractor has reached its destination for loading, the operator then turns the valve knob 82 fully to the right, thereby shutting off further communication between the air reservoir 92 and the bladder 56, and simultaneously permitting the air contained in the bladder 56 to be bled off through the valve opening 88. When such bleed-off has occurred, the springs 70 immediately act to compress the bldder 56 back into its original shape illustrated in FIG. 2. As long as the valve body 83 is passing pressurized air to the bladder 56, the pressure switch 98 will be actuated to turn on and maintain in illuminating condition the light 100. The ltter is, of course, connected to a power supply (not shown).

The present invention thus provides a simple, inexpensive and effective means for enabling the frame of a tractor or truck chassis to be pneumatically stabilized in such a manner as to eliminate the jarring and vibrations which are inherently attendant to the operation of a truck or tractor without load and which have proved to be not only a source of discomfort to the operator, but a contributing factor in the deterioration of such vehicles.

I claim:

1. Means for attenuating the jarring and vibration of a truck tractor designed to carry one end of, and pull a trailer, when said tractor is travelling on a road, without any trailer, said tractor including a horizontally disposed rectangular support frame, motor means supported on said frame, a pair of steerable wheels disposed below and supporting through a suspension system the front end of said frame, and a cab therefor, at least one differential axle operatively connected to said motor means, said axle having a housing and wheels at its opposite ends disposed below and supporting through another spring suspension system, the after end of said frame said first mentioned attenuating means comprising:
   i. a rigid elongated mounting member, said mounting member being securable transversely of, and to the side of elements forming said rectangular frame, for disposition directly above, and parallel to said differential axle;
   ii. an air bellows, said air bellows being expandable downwardly, when provided with air under pressure, to press against said axle housing at a point intermediate the axle, and thereby attenuate road induced vibrations of said support frame through its said suspension system;
   iii. a source of air under pressure carried by the truck;

iv. manual valve control means, the last said means being conveniently accessible to the operator of said truck; and v. air conduit means, said air conduit means being connected to said source of air under pressure and also to said air bellows via said manual valve control means;

whereby, when said tractor is being operated without a trailer load, the truck operator, by operating said manual valve control means, may cause said bellows to be inflated to a desired extent and expanded downwardly against said axle housing to provide thereby an air cushion between said axle and, through said support member, said horizontal frame in opposition to the spring suspension system by which said frame is supported on said differential axle.

2. The means for attenuating the jarring and vibration of a truck tractor as described in claim 1, wherein the axle over which the rigid elongated mounting member is disposed, has a bulged differential housing and the air bellows expands downwardly to contact the top of said differential housing.

3. The means for attenuating the jarring and vibration of a truck tractor as described in claim 2 wherein said valve means is adapted in one setting not only to cut off further conduction of pressurized air to the air bellows, but also to provide a bleeding off of air pressure theretofore built up in said air belows.

4. The means for attenuating the jarring and vibration of a truck tractor as described in claim 3 wherein said expandable air bellows is provided at its lower end with a transverse flat plate, said plate extending radially beyond the periphery of said air bellows when compressed to its greater radial dimension, and compression spring means are provided to interconnect coaligned points on said lower plate and on the underside of rigid elongated mounting member, whereby, when the air pressure which expands said air bellows, is cut off and bleeding off of the air pressure in said bellows is permitted, said springs serve to compress said bellows back to its unexpanded state.

5. The means for attenuating the jarring and vibration of a truck tractor as described in claim 1 wherein said manual valve control means is disposed in the cab of the truck on the dashboard in front of the truck's operator's seat.

6. The means for attenuating the jarring and vibrations of a truck tractor as described in claim 5 wherein there is also provided on the dashboard of the truck in the vicinity of said manual valve control means and in operative association therewith, a pressure gauge to indicate the amount of air pressure being conducted from the pressure source through the valve control means to the air bellows.

7. The means for attenuating the jarring and vibration of a truck tractor as described in claim 5 wherein there is provided on the dashboard in the vicinity of said manual valve control means and in operative association therewith, a warning light which is illuminated whenever said manual valve control means has been set to permit the flow of pressurized air from said source of air pressure to said air bellows.

8. The means as described in claim 1 wherein said mounting member included means to adjust its length to a predetermined extent, thereby to permit said member and the air bellows mounted thereunder to be secured between parallel longitudinal frame members having different spacings between them.

* * * * *